March 4, 1924.

H. H. PICKRON 1,485,524

CRYSTAL DETECTOR FOR RADIOINSTRUMENTS

Filed March 9, 1923

INVENTOR.
Hugo H. Pickron.
BY Walter N. Haskell
his ATTORNEY.

Patented Mar. 4, 1924.

1,485,524

UNITED STATES PATENT OFFICE.

HUGO H. PICKRON, OF ROCK ISLAND, ILLINOIS, ASSIGNOR OF ONE-HALF TO W. E. COPP, OF ROCK ISLAND, ILLINOIS.

CRYSTAL DETECTOR FOR RADIO INSTRUMENTS.

Application filed March 9, 1923. Serial No. 623,893.

*To all whom it may concern:*

Be it known that I, HUGO H. PICKRON, a citizen of the United States, residing at Rock Island, in the county of Rock Island and State of Illinois, have invented certain new and useful Improvements in a Crystal Detector for Radio Instruments, of which the following is a specification.

My invention has reference to a crystal detector for radio instruments, and aims to increase the efficiency of such devices, by improving the character of the engagement between the contact member and the mineral. It frequently happens that a deposit of dust or moisture on the crystal will interfere with the perfect operation thereof, especially in instruments wherein a single point of contact is depended upon. I aim to overcome this difficulty by providing a yieldable contact member of peculiar construction, the contact end of which is of a circular or ring formation, increasing the likelihood of a contact thereof with the face of the crystal. This part is also rotatable, so that it can be manipulated to cut into any film or coating which may form on the face of the crystal. This part is also of a telescopic formation, so as to have a delicate yielding action under the control of adjustment features which are embodied in the device. By means of this adjustment feature the degree of contact can be quickly regulated, so as to conform to the amount of meter wave by which the instrument is affected.

Another purpose of the invention is to provide for a positive contact of the contacting element with the mineral, after the same has been properly adjusted, and to retain the same in such position so long as the same is suited to the meter waves passing through the same.

The above mentioned, and other features and advantages of the invention will more fully appear from the following specification, taken in connection with the accompanying drawings, in which.

Figure 1:
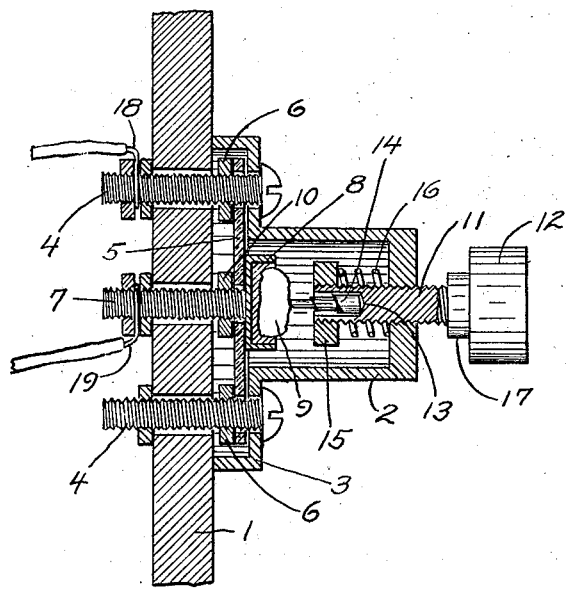
Fig. 1 shows the invention in vertical medial section.
Figure 2:
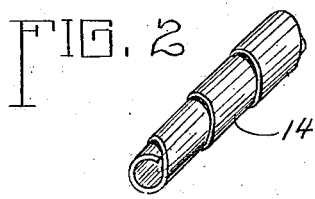
Fig. 2 is a detail of the spring 14, in perspective.

The reference numeral 1 indicates a section of a panel, or side of an instrument case, and 2 a cylindrical casing having an enlarged portion 3, which is attached to the panel 1 by means of bolts 4. Said bolts also pass through a strip 5 of fiber or similar non-conducting material, held in place in the part 2 by means of nuts 6. Passing through the strip 5 and panel 1 is a threaded stem 7, on the inner end of which, within the casing 2, is a crystal cup 8, within which is mounted a piece of mineral 9. The stem 7 is held in place by means of a nut 10, bearing against the strip 5.

The outer end of the casing 2 has a threaded perforation, to receive a similarly threaded stem 11, on the outer end of which is a thumb-turn 12. The inner end of said stem is recessed to receive a small helical spring 14, the spirals of which overlap each other, so that the spirals thereof can telescope within each other, until the spring disappears within the stem. On the inner end of the stem 11 is a collar 15, between which and the end of the casing 2 is an expansible coiled spring 16, which holds the stem against accidental movement in its seat. Movement of such stem inwardly is limited by a shoulder 17 thereon, which is designed to be spaced from the casing a suitable distance to prevent the inner end of the stem coming in contact with the mineral.

Connection is made with other parts of the instrument by wires 18 and 19, connected respectively, with one of the bolts 4 and the stem 7.

When in use the stem 11 is positioned with the end of the spring 14 lightly in contact with the mineral, as shown in the drawings. If properly adjusted no change in the relative positions of the parts may be necessary for a long period of time, but at times a variation in the length of the meter waves passing through the instrument will call for a delicate adjustment of the spring 14, in order to get better results.

The end of the spring 14 is preferably of a blunt circular form, as shown, and in case the face of the mineral becomes obscured to any extent by moisture or other coating, a slight rotation of the stem 11 will cause the end of the spring to cut through the same, renewing the contact, and improving the action of the device. In some cases it may be desired to increase the tension of the spring, and this can be accomplished by turning the stem in a proper direction, so that the spring will gradually telescope within itself and within the stem. The circular end of the spring will give a better opportunity for it to find a sensitive spot on the mineral, as it will not be limited to a single point, as in some devices of this kind. The tapered form of the spring 14 also permits of a limited later movement thereof in the outer end of the recess, facilitating the positioning thereof, when a contact of the same is being made with the mineral.

On account of the sensitive parts of the device being entirely enclosed within the casing 2, such parts are well protected, and the possibility of their being affected by atmospheric conditions is very remote.

While the invention has been herein set forth as being specially designed for use with what are known as crystal radio sets, it can be employed in other places, such as long distance sets having peanut or vacuum tubes, using crystal detectors.

What I claim, and desire to secure by Letters Patent, is:

1. A device of the class described, comprising a casing, provided in one of its ends with means for the support of a mineral, and in the opposite end with a threaded opening; a threaded member operable in said opening, and provided with a recess in its inner end; and a helical telescopic spring contained in said recess, and adapted for engagement with a mineral element contained in said casing.

2. A device of the class described, comprising a casing, adapted for attachment to an instrument box, provided in one of its ends with a mineral receptacle, and in its opposite end with a stem having a recess in its inner end; and a helical telescopic spring secured in said recess, and adapted for engagement with a mineral contained in said receptacle.

3. A device of the class described, comprising a casing, adapted for support on the panel of an instrument box, and provided in one of its ends with a mineral receptacle; a stem capable of longitudinal adjustment in the opposite end of said casing, provided with a recess in its inner end; a helical telescopic spring secured in said recess, so as to telescope into the same, adapted for contact with the face of a mineral in said receptacle; means for limiting the inward movement of said stem; and means for preventing accidental movement of said stem.

4. A device of the class described, comprising a casing, adapted for attachment to an instrument-box; a stem, rigidly mounted and connected with a mineral receptacle in one end of said casing; a stem longitudinally movable in the opposite end of said receptacle, provided with a recess in its inner end; and a helical coiled spring secured in said recess, and adapted for contact with the face of a mineral in said receptacle, said spring tapering outwardly, and being capable of a limited lateral movement in any direction.

5. A device of the class described, comprising a casing adapted for attachment to the panel of an instrument-box, provided in one of its ends with a mineral receptacle; a stem rotatably mounted in the opposite end of said casing, provided with a recess in its inner end; and a helical telescopic spring secured in said recess, and provided with a circular end for contact with a mineral contained in said receptacle.

In testimony whereof I affix my signature.

HUGO H. PICKRON.